US006808559B2

(12) United States Patent
Golley et al.

(10) Patent No.: US 6,808,559 B2
(45) Date of Patent: Oct. 26, 2004

(54) KAOLIN CLAY PIGMENTS SUITED TO ROTOGRAVURE PRINTING APPLICATIONS AND METHOD FOR PREPARING THE SAME

(75) Inventors: Christopher R.L. Golley, Sandersville, GA (US); John A. Manasso, Roswell, GA (US)

(73) Assignee: Imerys Pigments, Inc., Roswell, GA (US)

(*) Notice: Subject to any disclaimer, the term of this patent is extended or adjusted under 35 U.S.C. 154(b) by 0 days.

(21) Appl. No.: 10/324,019

(22) Filed: Dec. 20, 2002

(65) Prior Publication Data

US 2003/0164117 A1 Sep. 4, 2003

Related U.S. Application Data

(60) Provisional application No. 60/359,372, filed on Feb. 26, 2002.

(51) Int. Cl.[7] ............................................... C04B 14/10
(52) U.S. Cl. ..................... 106/486; 106/484; 106/488; 106/31.6; 106/31.9; 162/162; 162/181.8; 428/537.5
(58) Field of Search ................... 106/484, 486, 106/488, 31.6, 31.9, 487; 162/162, 181.8

(56) References Cited

U.S. PATENT DOCUMENTS

| | | | |
|---|---|---|---|
| 2,158,987 A | 5/1939 | Maloney | |
| 3,034,859 A | 5/1962 | Gunn et al. | |
| 3,171,718 A | 3/1965 | Gunn et al. | |
| 3,526,768 A | 9/1970 | Rai et al. | |
| 3,615,806 A | 10/1971 | Torock et al. | |
| 3,635,662 A | 1/1972 | Lyons | |
| 3,798,044 A | 3/1974 | Whitley et al. | |
| 4,125,411 A | 11/1978 | Lyons | |
| 4,176,148 A | 11/1979 | Magder et al. | |

(List continued on next page.)

FOREIGN PATENT DOCUMENTS

| | | |
|---|---|---|
| DE | 2 241 577 | 3/1973 |
| DE | 24 49 656 | 12/1975 |
| DE | 26 58 814 | 2/1978 |

(List continued on next page.)

OTHER PUBLICATIONS

Brochure: "Kaopaques Delaminated Aluminum Silicates for Paint Systems," Georgia Kaolin Co., 433 N. Broad Street, Elizabeth, NJ 07207, Oct. 1975.

Burgess, Malcolm, "Kaolin, a Glaciers Gift to Georgia," 1985.

Clay Minerals Society Homepage, http://cms/lanl.gov/instruct.html, "Instructions for Authors, Clays and Clay Minerals," *Instructions for Authors*, p. 4 of 5.

(List continued on next page.)

*Primary Examiner*—C. Melissa Koslow
*Assistant Examiner*—Shalie Manlove
(74) *Attorney, Agent, or Firm*—Finnegan, Henderson, Farabow, Garrett & Dunner, L.L.P.

(57) ABSTRACT

The present invention provides kaolin clay pigments having at least the following characteristics: Brightness (GE): at least about 89.0; Shape Factor: at least about 30; Brookfield viscosity, measured at 20 rpm and at less than or equal to about 65% solids: about 100 to about 700 centipoise; and Hercules viscosity, measured at 18 dynes and at less than or equal to about 65% solids: about 200 rpm to about 1000 rpm. Preferred kaolin sources include Brazilian kaolins, especially Rio Capim kaolins. The kaolin pigments of the present invention possess a combination of optical and physical properties, such as brightness, printability, and transfer efficiency, not previously seen in existing commercial products. They are useful, e.g., in paper filler and coating compositions, ink compositions, and printing applications, especially rotogravure printing.

47 Claims, 10 Drawing Sheets

U.S. PATENT DOCUMENTS

| | | |
|---|---|---|
| 4,183,991 A | 1/1980 | Smiley et al. |
| 4,198,333 A | 4/1980 | von Bonin et al. |
| 4,221,697 A | 9/1980 | Osborn et al. |
| 4,225,496 A | 9/1980 | Columbus et al. |
| 4,227,920 A | 10/1980 | Chapman et al. |
| 4,233,199 A | 11/1980 | Abolins et al. |
| 4,234,469 A | 11/1980 | Ohta et al. |
| 4,241,142 A | 12/1980 | Kaliski et al. |
| 4,243,574 A | 1/1981 | Manwiller |
| 4,250,077 A | 2/1981 | von Bonin et al. |
| 4,251,576 A | 2/1981 | Osborn et al. |
| 4,298,711 A | 11/1981 | Moulson et al. |
| 4,311,635 A | 1/1982 | Pearson |
| 4,359,497 A | 11/1982 | Magder et al. |
| 4,381,948 A | 5/1983 | McConnell et al. |
| 4,409,344 A | 10/1983 | Moulson et al. |
| 4,414,352 A | 11/1983 | Cohen et al. |
| 4,427,450 A | 1/1984 | Kostansek |
| 4,467,057 A | 8/1984 | Dieck et al. |
| 4,543,287 A | 9/1985 | Briggs et al. |
| 4,546,126 A | 10/1985 | Breitenfellner et al. |
| 4,582,866 A | 4/1986 | Shain |
| 4,584,333 A | 4/1986 | Prigent et al. |
| 4,708,975 A | 11/1987 | Shain |
| 4,795,776 A | 1/1989 | Milner |
| 4,820,761 A | 4/1989 | Saito et al. |
| 4,873,116 A | 10/1989 | Ancker |
| 4,888,315 A | 12/1989 | Bowman et al. |
| 4,889,886 A | 12/1989 | Wada et al. |
| 4,918,127 A | 4/1990 | Adur et al. |
| 4,943,324 A | 7/1990 | Bundy et al. |
| 4,966,638 A | 10/1990 | Mudgett |
| 4,981,521 A | 1/1991 | Bettacchi et al. |
| 5,085,707 A | 2/1992 | Bundy et al. |
| 5,112,782 A | 5/1992 | Brown et al. |
| 5,128,606 A | 7/1992 | Gate et al. |
| 5,167,707 A | 12/1992 | Freeman et al. |
| 5,168,083 A | 12/1992 | Matthews et al. |
| 5,169,443 A | 12/1992 | Willis et al. |
| 5,294,654 A | 3/1994 | Hellstern-Burnell et al. |
| 5,332,493 A | 7/1994 | Ginn et al. |
| 5,364,899 A | 11/1994 | Watanabe et al. |
| 5,411,587 A | 5/1995 | Willis et al. |
| 5,416,151 A | 5/1995 | Tanaka |
| 5,439,558 A | 8/1995 | Bergmann et al. |
| 5,454,865 A | 10/1995 | Ginn et al. |
| 5,516,829 A | 5/1996 | Davis et al. |
| 5,522,924 A | 6/1996 | Smith et al. |
| 5,573,946 A | 11/1996 | Haxell et al. |
| 5,578,659 A | 11/1996 | Anada et al. |
| 5,624,488 A | 4/1997 | Forbus et al. |
| 5,645,635 A | 7/1997 | Behl et al. |
| 5,685,900 A | 11/1997 | Yuan et al. |
| 5,707,912 A | 1/1998 | Lowe et al. |
| 5,735,946 A | 4/1998 | Bloodworth et al. |
| 5,749,958 A | 5/1998 | Behl et al. |
| 5,810,998 A | 9/1998 | Arrington-Webb et al. |
| 5,846,309 A | 12/1998 | Freeman et al. |
| 5,879,512 A | 3/1999 | McGenity et al. |
| 5,925,454 A | 7/1999 | Bekele |
| 5,948,156 A | 9/1999 | Coutelle et al. |
| 6,031,036 A | 2/2000 | Rosenquist et al. |
| 6,149,723 A | 11/2000 | Pruett et al. |
| 6,186,335 B1 | 2/2001 | Arrington-Webb et al. |
| 6,262,161 B1 | 7/2001 | Betso et al. |
| RE37,385 E | 9/2001 | Okada et al. |
| 6,312,511 B1 | 11/2001 | Bilimoria et al. |
| 6,402,826 B1 | 6/2002 | Yuan et al. |
| 6,537,363 B1 | 3/2003 | Golley et al. |
| 6,554,892 B1 | 4/2003 | Manasso et al. |
| 6,564,199 B1 | 5/2003 | Pruett et al. |

FOREIGN PATENT DOCUMENTS

| | | |
|---|---|---|
| DE | 28 18 954 | 11/1978 |
| DE | 27 39 620 | 3/1979 |
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 38 84 605 | 8/1988 |
| DE | 43 01 730 | 7/1993 |
| DE | 42 13 746 | 10/1993 |
| DE | 100 10 941 | 9/2001 |
| EP | 0 001 066 | 4/1980 |
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |
| EP | 0 274 888 | 7/1988 |
| EP | 0 341 981 | 11/1989 |
| EP | 0 352 714 | 1/1990 |
| EP | 0 456 363 | 11/1991 |
| EP | 0 475 434 | 3/1992 |
| EP | 0 524 635 | 1/1993 |
| EP | 0 528 078 | 2/1993 |
| EP | 0 586 904 | 3/1994 |
| EP | 0 588 239 | 3/1994 |
| EP | 0 589 461 | 3/1994 |
| EP | 0 596 442 | 5/1994 |
| EP | 0 691 375 | 1/1996 |
| EP | 0 824 130 | 2/1998 |
| EP | 1 088 852 | 4/2001 |
| FR | 2 150 953 | 4/1973 |
| FR | 2 273 040 | 12/1975 |
| FR | 2 359 874 | 2/1978 |
| FR | 2 389 645 | 12/1978 |
| FR | 2 452 511 | 10/1980 |
| FR | 2 558 168 | 7/1985 |
| FR | 2 774 689 | 8/1999 |
| GB | 1032536 | 6/1966 |
| GB | 1118723 | 7/1968 |
| GB | 1375057 | 11/1974 |
| GB | 1469028 | 3/1977 |
| GB | 1493393 | 11/1977 |
| GB | 1513657 | 6/1978 |
| GB | 1597213 | 9/1981 |
| GB | 2223758 | 4/1990 |
| GB | 2240398 | 7/1991 |
| GB | 2310215 | 8/1997 |
| JP | 51005383 | 1/1976 |
| JP | 53016063 | 2/1978 |
| JP | 54010394 | 1/1979 |
| JP | 54047751 | 4/1979 |
| JP | 55131024 | 10/1980 |
| JP | 59074152 | 4/1984 |
| JP | 60023448 | 2/1985 |
| JP | 60038455 | 2/1985 |
| JP | 60084364 | 5/1985 |
| JP | 60161443 | 8/1985 |
| JP | 60235858 | 11/1985 |
| JP | 62116667 | 5/1987 |

| | | |
|---|---|---|
| JP | 62232452 | 10/1987 |
| JP | 63132964 | 6/1988 |
| JP | 63175047 | 7/1988 |
| JP | 02-018362 | 1/1990 |
| JP | 02034653 | 2/1990 |
| JP | 02045551 | 2/1990 |
| JP | 04122752 | 4/1992 |
| JP | 05262974 | 10/1993 |
| JP | 06016918 | 1/1994 |
| JP | 06065490 | 3/1994 |
| JP | 06502684 | 3/1994 |
| JP | 06145442 | 5/1994 |
| JP | 07502068 | 3/1995 |
| JP | 08022945 | 1/1996 |
| JP | 10114854 | 5/1998 |
| JP | 2000345032 | 12/2000 |
| JP | 2001098149 | 4/2001 |
| WO | WO 80/01167 | 6/1980 |
| WO | WO 80/02430 | 11/1980 |
| WO | WO 88/05804 | 8/1988 |
| WO | WO 90/11605 | 10/1990 |
| WO | WO 93/04119 | 3/1993 |
| WO | WO 94/07956 | 4/1994 |
| WO | WO 97/32934 | 9/1997 |
| WO | WO 97/34956 | 9/1997 |
| WO | WO 9837152 | 8/1998 |
| WO | WO 98/56860 | 12/1998 |
| WO | WO 98/58613 | 12/1998 |
| WO | WO 99/41309 | 8/1999 |
| WO | WO 99/51815 | 10/1999 |
| WO | WO 99/58613 | * 11/1999 |
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 01/12708 | 2/2001 |
| WO | WO 01/46307 | 6/2001 |
| WO | WO 01/66627 | 9/2001 |
| WO | WO 01/66635 | 9/2001 |
| WO | WO 02/16509 | 2/2002 |

OTHER PUBLICATIONS

Jepson, W.P., "Kaolins, their properties and uses," *Phil. Trans. R. Soc. Lond.*, A311, 411–432, 1984.

Swan, A., "Realistic paper tests for various printing processes," *Printing Technology*, 13(1), 9–22, Apr. 1969.

Abstract, Japanese Patent No. 08012886A, publication date Jan. 1996.

Abstract, German Patent No. 3679147.

Abstract, German Patent No. 3689760.

Abstract, German Patent No. 3565272.

Abstract, German Patent No. 3466547.

* cited by examiner

KAOLIN CLAY PIGMENTS SUITED TO ROTOGRAVURE PRINTING APPLICATIONS AND METHOD FOR PREPARING THE SAME

RELATED APPLICATION

This non-provisional application claims the benefit of priority under 35 U.S.C. §119(e) to U.S. Provisional Application No. 60/359,372, filed Feb. 26, 2002, entitled "KAOLIN CLAY PIGMENTS SUITED TO ROTOGRAVURE PRINTING APPLICATIONS AND METHOD FOR PREPARING THE SAME," the disclosure of which is incorporated by reference herein in its entirety.

FIELD OF THE INVENTION

The present invention relates to improved kaolin clay products suitable for use in rotogravure printing processes, for coating lightweight and ultra lightweight paper for rotogravure and offset printing, and to methods for making the same.

BACKGROUND OF THE INVENTION

Large amounts of kaolin find use as pigments in paper coating and filling compositions. Kaolinite, the principal constituent of kaolin clay (or kaolinitic clay), is a white clay mineral that imparts brightness, gloss, smoothness, printability, and other desirable properties to the surface of coated paper, paper board, super-calendared paper, and other paper related products.

Kaolin clays also find use as pigments in rotogravure paper, including lightweight coated paper (LWC) and ultra lightweight coated paper (ULWC), and as pigments and extenders in rotogravure printing inks. Rotogravure is a printing system commonly used to print large numbers of high quality images. Typical applications include the printing seen on packaging materials and in color magazines. In rotogravure printing, the image to be printed is etched into the surface of a printing apparatus, typically a metal roll or sheet. Ink is applied to the surface of the apparatus, filling holes or cells that comprise the etched image. Printing occurs when the surface to be printed (paper or plastic, for instance) directly contacts the printing apparatus.

Lightweight coated, or LWC, paper is generally used for printing magazines, catalogues and advertising or promotional material. LWC paper coated to a weight of from about 5 $g/m^2$ to about 13 $g/m^2$ on each side, and the total grammage, or weight per unit area of the coated paper, is generally in the range of from about 49 $g/m^2$ to about 65 $g/m^2$. The coating may conveniently be applied by means of a coating machine including a short dwell time coating head, which is a device in which a captive pond of coating composition under a slightly elevated pressure is held in contact with a moving paper web for a time in the range of from 0.0004 second to 0.01 second, before excess coating composition is removed by means of a trailing blade. However, other types of coating apparatus may also be used for preparing lightweight coated paper. The coated paper is required to meet certain standards of surface gloss and smoothness. For example, the paper is generally required to have a gloss value of at least about 32, and up to about 60, TAPPI units, and a Parker Print Surf value in the range of from about 0.5 to about 1.6 $\mu m$.

Ultra lightweight coated, or ULWC, paper, sometimes otherwise known as light lightweight coated, or LLWC, paper is generally used for catalogues and for advertising and promotional material sent through the mail to reduce mailing costs. The coating weight is generally in the range of from 5 $g/m^2$ to 7 $g/m^2$ per side. The grammage is generally in the range of from about 35 $g/m^2$ to about 48 $g/m^2$.

Rotogravure, like other printing processes, typically requires kaolin pigments having good brightness, and which are capable of imparting good opacity, gloss, and smoothness to printed surfaces. The latter property impacts printability. The higher the smoothness, the better the printability.

To enhance smoothness and printability, it is most advantageous in rotogravure printing applications to use kaolins that allow the most efficient transfer of the ink from the printing apparatus to the surface being printed. When the ink from one or more cells of the etched image fails to transfer to the printed surface, a phenomenon called "missing dots" occurs. Fewer missing dots indicate better transfer and improved print quality. One method for quantifying ink transfer efficiency entails counting the distance between, for example, the first and the twentieth missing dot on a sufficiently large printed area. The longer the distance, the better the transfer efficiency and the better the quality of the printed image.

Kaolins most suited to rotogravure printing have a high shape factor (i.e., highly platy) and a controlled particle size distribution. Traditionally, kaolins mined from primary deposits, such as may be found in Cornwall, U.K., parts of Germany, and the Czech Republic, have found widespread use in rotogravure printing partly because their crystal structure allows them to be delaminated to give particles having an appropriate degree of platiness. More recently, it has been Found that certain sedimentary kaolin deposits, such as those found in Georgia, U.S.A., can also be delaminated to yield suitable high shape factor pigments. However, such kaolins are relatively impure and thus lack the degree of brightness and transfer efficiency that would be desirable in rotogravure pigments.

Kaolins from certain other sedimentary deposits, such as may be found in the Rio Capim region of Brazil, are known for their purity and brightness. But Rio Capim kaolins were generally thought to be too blocky to be of use in applications, like rotogravure printing, that require highly platy particles. Thus, Bilimoria et al., U.S. Pat. No. 6,312,511, disclose the use of Rio Capim clay as the source for both delaminated and non-delaminated kaolin pigments having high brightness and high opacity for paper coating and filling. The patent is silent, however, as to kaolins having high brightness and high shape factor, and does not disclose the use of Rio Capim crudes in the manufacture of kaolin pigments suited for various uses, including rotogravure printing. Willis et al., U.S. Pat. No. 5,169,443, teach the use of Rio Capim derived kaolin feed in the manufacture of pigments for rotogravure printing. Willis' pigments are engineered to exhibit a specific combination of properties (viscosity, particle size distribution, and others) to render them highly workable at high solids concentration (67% solids and above). The patent is silent as to transfer efficiency, however, and does not disclose kaolins having high brightness and high shape factor. Thus, there remains a need in the art for improved kaolin pigments having higher brightness, improved transfer efficiency, and other properties. The present invention meets these and other needs.

SUMMARY OF THE INVENTION

The present invention provides kaolin clay pigments having at least the following characteristics:

Brightness (GE): at least about 89.0;

Shape Factor: at least about 30;

Brookfield viscosity, measured at 20 rpm and at less than or equal to about 65% solids: about 100 to about 700 centipoise; and Hercules viscosity, measured at 18 dynes and at less than or equal to about 65% solids: about 200 rpm to about 1000 rpm.

The kaolins pigments of the present invention possess a combination of optical and physical properties, i.e., brightness and shape factor, not previously seen in existing commercial or known products. The present invention encompasses these pigments, compositions comprising them, and any application in which they are used. Such compositions include, but are not limited to, paper filler, paper coating, and ink compositions. Such applications include, but are not limited to, the corresponding uses of these compositions. In particular, coating, filler, and ink formulations comprising the inventive pigments may advantageously be used in gravure and rotogravure printing. When used in ink formulations and as paper fillers and coatings, the kaolin pigments of the present invention impart good printability and ink transfer efficiency.

The pigments of the present invention may be prepared according to the following process:

(a) Blunging and degritting crude kaolin;

(b) Classifying the blunged crude kaolin into coarse and fine fractions;

(c) Forming an aqueous suspension of the coarse fraction;

(d) Delaminating the aqueous suspension; and (e) Beneficiating the aqueous suspension, wherein the method results in a kaolin pigment having at least the following characteristics:

Brightness (GE): at least about 89.0;

Shape Factor: at least about 30;

Brookfield viscosity, measured at 20 rpm and at less than or equal to about 65% solids: about 100 to about 700 centipoise; and Hercules viscosity, measured at 18 dynes and at less than or equal to about 65% solids: about 200 rpm to about 1000 rpm.

DETAILED DESCRIPTION OF THE INVENTION

Figure 1:
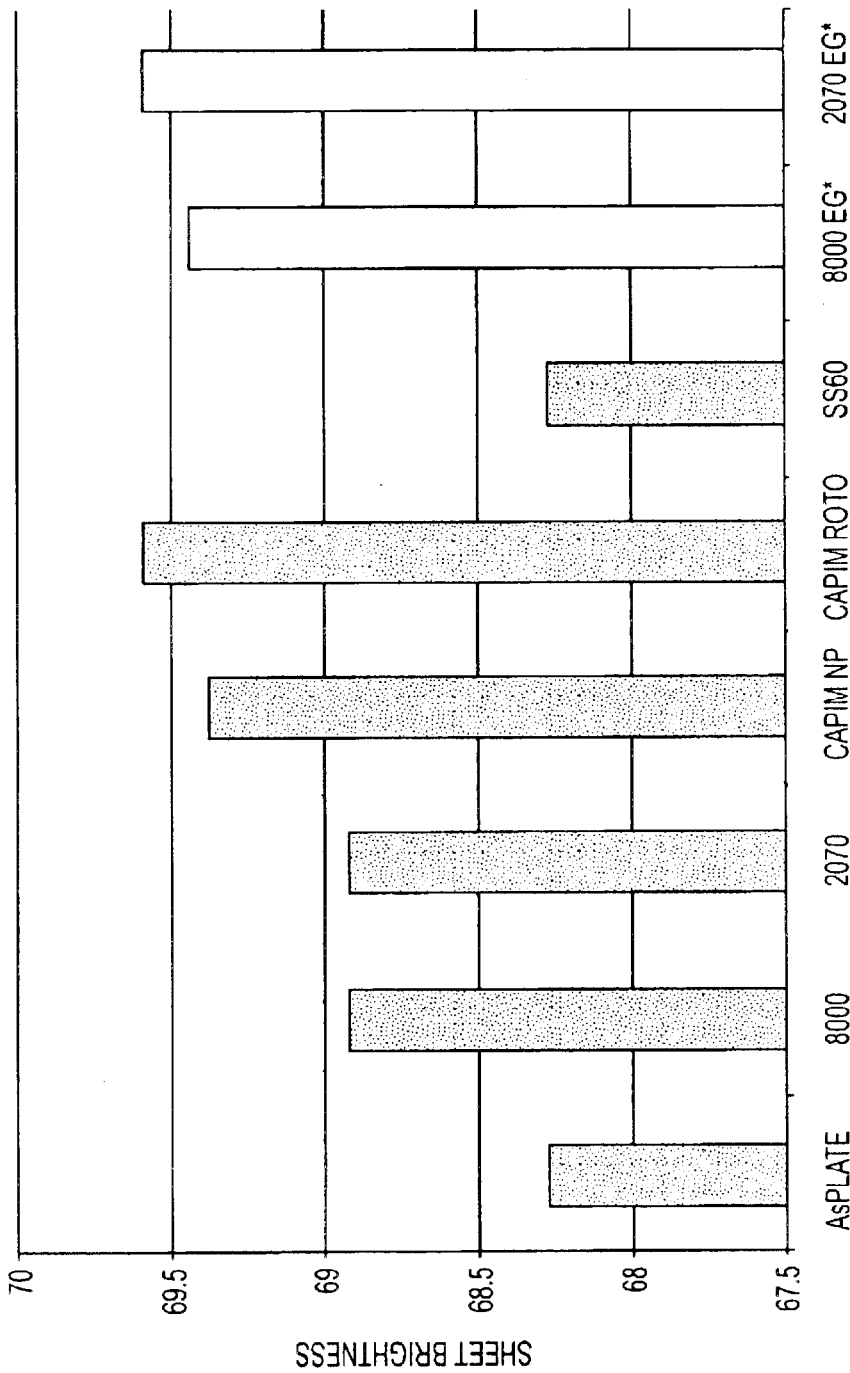
FIG. 1 presents comparative data of interpolated sheet brightness values for the inventive and selected prior art pigments.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The kaolin pigments of the present invention have at least the following characteristics:

GE Brightness: at least about 89.0, advantageously at least about 90.0, and at least about 92.0;

Shape Factor: at least about 30, advantageously at least about 40, and at least about 60;

Brookfield viscosity, measured at 20 rpm and at less than or equal to about 65% solids: about 100 to about 700 centipoise, and in certain embodiments about 200 to about 500;

Hercules viscosity, measured at 18 dynes and at less than or equal to about 65% solids: about 200 rpm to about 1000 rpm, and in certain embodiments about 500 rpm to about 1000 rpm, and about 700 to about 1000 rpm;

The kaolin pigments of the present invention may also optionally exhibit a Steepness (d.30/d.70×100) of at least about 30, the value of which changes with embodiments to at least about 35, at least about 40, at least about 45, and at least about 50; and/or have a particle size distribution (e.s.d. as determined by Sedigraph) satisfying the following ratio:

$$\frac{\% \text{ finer than } 2.0\ \mu m}{\% \text{ finer than } 0.5\ \mu m} \geq \text{about } 3.$$

Unless otherwise expressly indicated, the numerical parameters used in the present specification and attached claims are approximations, understood as being modified by the term "about." All percentages listed are by weight, unless otherwise indicated.

GE Brightness, as expressed herein, is defined in TAPPI Standard T452 and refers to the percentage reflectance to light of a 457 nm wavelength according to methods well known to those of ordinary skill in the art.

Shape factor, as used herein, is a measure of an average value (on a weight average basis) of the ratio of mean particle diameter to particle thickness for a population of particles of varying size and shape as measured using the electrical conductivity method and apparatus described in U.S. Pat. No. 5,128,606, issued to Gate et al., ("the '606 patent") which is incorporated herein by reference in its entirety. In the measurement method described in the '606 patent, the electrical conductivity of a fully dispersed aqueous suspension of the particles under test is caused to flow through an elongate tube. Measurements of the electrical conductivity are taken between (a) a pair of electrodes separated from one another along the longitudinal axis of the tube. And (b) a pair of electrodes separated from one another across the transverse width of the tube. Using the difference between the two conductivity measurements, the shape factor of the particulate material under test is determined.

Viscosity, as used herein, is a measure of a kaolin clay's Theological properties. More particularly, viscosity is a measure of a clay's resistance to changes in flow. Those having ordinary skill in the art are familiar with typical ways of measuring viscosity, which include Brookfield viscosity and Hercules viscosity.

Brookfield viscometers provide a measure of a clay slurry's low shear viscosity, expressed in units of centipoise. One centipoise is equal to one centimeter-gram-second unit. (One centipoise is one hundredth ($10^{-2}$) of a poise.) Thus, all other things being equal, a 100 centipoise sample has a lower viscosity than a 500 centipoise sample.

Hercules viscometers provide a measure of a clay slurry's high shear viscosity. Hercules viscosity is typically measured by placing a cylinder (bob) of appropriate diameter and length (typically the A-bob) into a sample clay slurry. Hercules viscosities of various samples can be compared by holding constant the percent solids concentration of the sample, the bob size, and the applied force. The Hercules viscometer applies a force to the bob which causes it to spin at a controlled accelerating rate. As the viscometer increases the bob spin rate, the viscous drag on the cup increases. Clay slurries with poor high shear rheology will exert the maximum measurable force on the cup at a lower bob rpm than clay slurries with "good" high shear rheology. Hercules viscosity is therefore typically expressed in terms of bob spin rates, or revolutions per minute (rpm). A "dyne endpoint" is an indication of very low Hercules viscosity. A dyne endpoint is reached when the bob reaches its maximum rpm before the maximum measurable force is exerted on the cup.

"Particle size," as used herein, e.g., in the context of particle size distribution, is measured in terms of equivalent spherical diameter. Sometimes referred to as $d_{50}$ value, median particle size and other particle size properties referred to in the present application are measured in a well known manner by sedimentation of the particle material in a fully dispersed condition in an aqueous medium using a SEDIGRAPH 5100 machine as supplied by Micrometerics Corporation. Such a machine provides measurements and a plot of the cumulative percentage by weight of particles having a size, referred to in the art as "equivalent spherical diameter" (e.s.d.), less than the given e.s.d. values. The mean particle size $d_{50}$ is the value determined in this way of the particle e.s.d. at which there are 50% by weight of the particles which have an e.s.d. less than that $d_{50}$ value.

"Steepness: (d.30/d.70×100)," as used herein, refers to the steepness (or narrowness) of the particle size distribution (psd). This, in turn, refers to the slope of the psd curve of the particulate kaolin according to the present invention. Steepness, as used herein, is measured as 100 times the ratio of the $d_{30}$ to $d_{70}$, where $d_{30}$ is the value of the particle e.s.d. less than which there are 30% of the particles and $d_{70}$ is the value of the particle e.s.d. less than which there are 70% of the particles, both obtained from the Sedigraph measurement described above.

The gloss of a coated paper surface, as used herein, may be measured by means of a test laid down in TAPPI Standard No. 480 ts-65. The intensity of light reflected at an angle from the surface of the paper is measured and compared with a standard of known gloss value. The beams of incident and reflected light are both at an angle of 750 to the normal to the paper surface. The results are expressed as TAPPI gloss units.

The kaolins pigments of the present invention possess a combination of optical and physical properties, i.e., brightness and shape factor, not previously seen in existing commercial or known products. Advantageously, the present kaolins derive from Rio Capim kaolins. The present invention encompasses these pigments, compositions comprising them, and any application in which they are used. Such compositions include, but are not limited to, ink, paper filler, and paper coating compositions. Such applications include, but are not limited to, the corresponding uses of these compositions. In particular, ink, filler, and coating formulations comprising the inventive pigments may advantageously be used in gravure and rotogravure printing. When used in ink formulations and as paper filler and coatings, the kaolin pigments of the present invention impart good printability and ink transfer efficiency.

The kaolin pigments according to the invention may be prepared according to the following process, as now described.

Crude feed kaolin clay is first blunged. Any suitable kaolin feed capable of providing a product having the stated properties may serve as the crude feed. In certain embodiments, the crude feed derives from Brazilian kaolins, more particularly from the Rio Capim region of Brazil. Any suitable kaolin crude feed may serve as the feed, however.

Blunging mixes the crude feed clay with water in a high-energy mixer, known by those skilled in the art as a blunger. A sufficient amount of water is added during blunging to form an aqueous suspension of the crude. Typically, the blunged suspension will contain about 60% to about 70% solids. However, the blunging could be carried out at solids as low as about 20%.

Initially and during blunging, the pH of the slurry will typically be in the range of from about 4.0 to about 9.5, advantageously from about 6.5 to about 8.0. The pH of the suspension can be adjusted during blunging typically to within about 0.5 pH units of neutral to help deflocculate the suspension. The pH may be adjusted by the addition of one or more pH adjusting agents. Acceptable pH adjusting agents include any known or after-discovered chemicals, gases, or other agents capable of bringing the pH to suitable levels. For example, pH adjusting chemicals include, but are not limited to, sodium, potassium, or ammonium hydroxides or carbonates, preferably sodium hydroxide or carbonate. Appropriate amounts of the pH adjusting agent may be added as needed to achieve the target pH, typically in the range of from about 0.5 to about 5.0 pounds per ton.

Dispersing agents may also be added during blunging to aid in forming the aqueous suspension. Suitable dispersing agents include any known or after-discovered dispersing agents capable of aiding deflocculation. For example dispersing agents include sodium hexametaphosphate, tetra sodium polyphosphate, sodium silicates, sodium polyacrylate, sodium salts of polyacrlamide/acylate copolymers, or the ammonium or potassium salts thereof. Dispersing agents are typically added in a dose range of about 2 to about 10 pounds per ton of kaolin on a dry basis. Advantageously, the dose range is from about 3 to about 6 pounds per ton.

After blunging, the crude suspension may be fractionated as necessary into fine and coarse fractions. Fractionation (or classification) may be accomplished using any known or after-discovered method. Appropriate methods include gravity sedimentation or elutriation, any type of hydrocyclone apparatus, or, preferably, a solid bowl decanter centrifuge, disc nozzle centrifuge, or the like. The fine fraction, once separate, can be used in the production of other commercial products.

The separated coarse fraction, called b-fraction, typically has a psd such that the percentage less than 2 $\mu$m content is from about 20% to about 40%. The b-fraction may be diluted to from about 10% to about 60%, with certain embodiments ranging about 30% to about 50%, with about 40% solids being exemplary. It may also be mixed with one or more of the aforementioned dispersing agents.

The coarse b-fraction is then subjected to delamination. Delamination may be accomplished by any known or after-discovered methods, such as sand or attrition grinding, bead milling, or ball milling. The delamination may be achieved in any proprietary grinder or commercially available apparatus including, but not limited to, Denver attrition scrubber, Drias mill, Netsch mill, Matter mill, and vibo-energy mill.

The delaminated product may then be subjected to one or more beneficiation processes to improve brightness and to remove impurities as necessary. Thus, for example, the delaminated b-fraction is advantageously subjected to magnetic separation and/or reductive bleaching to remove iron- and/or titanium-containing (and other) impurities. Appropriate magnetic separators include any commercial or proprietary "high intensity" magnetic separator with a minimum applied field strength of 0.5 tesla. Typical equipment includes the Carpco reciprocating magnet or a PEM HIMS (High Intensity Magnetic Separator). Permanent magnet, copper coil electromagnet, or superconducting magnet systems can be beneficially employed.

Reductive bleaching agents include sodium hydrosulfite (hydros) in a dose range about 0.5 to about 5 pounds per ton of kaolin, advantageously less than about 4 pounds per ton, on a dry basis. However, any other suitable reductive bleaching agent, such as formamidine sulphinic acid, may be employed. Reductive bleaching using hydros is preferably carried out in acidic pH. The pH is in the range of about 2.0 to about 4.5. Any mineral or organic acid or alum solution can be used to adjust the pH to the required value. For example, pH modifiers include sulfuric acid, with pH of from about 2.5 to about 3.5 and alum solution, with pH of from about 3.5 to about 4.5. In both cases, sodium hydrosulfite can be the reductive bleaching agent. The kaolin slurry is mixed with the chosen acidifying agent to bring the pH to the chosen value, as dictated by kinetics and other considerations.

The beneficiated product may then be advantageously filtered and redispersed to form an aqueous slurry. Suitable dispersion agents include any known or after-discovered dispersion agent, such as sodium polyacrylate, sodium hexametaphosphate, tetra-sodium polyphosphate, or the like. The pH of the dispersed slurry may be returned to neutral, typically to within about 0.5 pH units of neutral, using one of the aforementioned pH adjusting agents.

The refined, neutral product is then subjected to evaporation or spray-drying as necessary, and its solids level adjusted to an upper limit dictated by the intended product's rheological characteristics. In the case of the products of the invention, the upper limit is about 65% solids, but lower solids concentrations may be made as according to specification.

As previously indicated, the kaolin pigments of the present invention may be used to formulate ink compositions. Ink compositions of the present invention comprise the above described pigments and an ink base, and may be formulated for any desired use including, but not limited to, gravure and rotogravure printing. The inventive pigments may be used alone or together with other pigments. Preferred additional pigments include, but are not limited to, titanium dioxide, talc ground calcium carbonate, precipitated calcium carbonate, synthetic plastic pigments, sodium alumina silicate, and calcined and other hydrous kaolins.

Preferably, the inventive pigments comprise at least about 60%, up to about 100%, of the total pigments present in the ink composition, with the balance comprising combinations of one or more of a suitable ancillary pigment. Suitable ink bases comprise are well known to those of ordinary skill in the art.

The kaolin pigments of the present invention may also be used as paper fillers and coatings. A filler composition may comprise from about 1% to about 35% of the inventive pigment, the balance comprising sheet cellulose fiber and other ancillary ingredients. A paper coating composition, or coating basestock, may comprise from about 2% to about 10% of the inventive pigment, with the balance comprising other ancillary ingredients. Ancillary ingredients for filler and compositions are well known to those of ordinary skill in the art and are selected on the basis of the contemplated use. Ancillary ingredients for filler and coating compositions include, but are not limited to, pigments, such as titanium dioxide, talc ground calcium carbonate, precipitated calcium carbonate, synthetic plastic pigments, sodium alumina silicate, and calcined and other hydrous kaolins. Ancillary ingredients may also include suitable polymeric materials, which can be added to help retain the pigments in the cellulose web as it is being formed, cellulose fibers, sizing agents, and coated (for coatings) or uncoated (for fillers) recycle broke fibers and the like.

The coatings or fillers of the present invention may be used to coat or fill any suitable cellulose based substrate. Such substrates include, but are not limited to, wood-containing or wood-free sheets, typically #3 to #5 coated grades, which grades are familiar to those of ordinary skill in the art. Fillers comprising the inventive pigments may be used in, for example, supercalandered paper, newsprint, directory grades, uncoated freesheet, and coating basestock.

Paper coated or filled with the coating or filler compositions comprising in part the inventive pigments, exhibit good smoothness, brightness, and other desirable characteristics. For instance, paper coated or filled with compositions comprising the inventive pigments may exhibit GE Brightness of at least about 65.0, and in certain embodiments at least about 69.0. Smoothness, as previously indicated, enhances printability. Smoothness and printability can be measured in ways well known to those of ordinary skill in the art. Suitable tests for smoothness include the Parker Print Surf Roughness test and missing dots test, as described in the examples that follow. Paper coated or filled with compositions comprising the pigments of the present invention exhibit Parker Print Surf Roughness of about 0.7 to about 1.5, with certain embodiments exhibiting ranges of about 0.7 to about 1.0, and about 0.7 to about 0.9 units.

Papers filled or coated with pigments of the present invention, or inks comprising the inventive pigments (alone or in combination), exhibit excellent ink transfer efficiency. Transfer efficiency, as previously indicated, is a measure of the rate at which ink transfers from ink cells contained in a printing apparatus to the surface of the substrate being printed. When the ink from one or more cells of an etched image, e.g., in a rotogravure printing apparatus, fails to transfer to the printed surface, a phenomenon called "missing dots" occurs. Fewer missing dots indicate better ink transfer and improved print quality.

As described above, one method for quantifying ink transfer efficiency entails counting the distance between, for instance, the first and the twentieth-missing dot on a sufficiently large printed area. The longer the distance between missing dots, the better the transfer efficiency. Papers coated or filled with the inventive pigments, or inks comprising the inventive pigments, alone or in combination, may exhibit at least about 15 mm to the twentieth missing dot, advantageously at least about 20 mm, and at least about 30 mm.

Cellulose substrates coated or filled with the pigments of the present invention may be used, as previously indicated, in gravure and rotogravure printing processes. Normal, LWC, and/or ULWC paper, or any other suitable substrate may optionally be used. Such processes may comprise, e.g., printing an image onto a suitable substrate, such as a cellulose based substrate, by passing papers coated or filled with the pigments of the present invention through currently known or after-invented rotogravure printing apparatuses according to methods known to those of ordinary skill in the art. Inks comprising the present invention may be used as the rotogravure ink. The inks comprising the inventive pigments and coated or filled substrates comprising the inventive pigments may be used separately or together.

Having described the invention generally, reference will now be made to the following non-limiting examples.

EXAMPLE 1

A rotogravure clay pigment suitable for printing and having a targeted 65% to 70% less than 2 μm psd and 50 shape factor was prepared as follows. Rio Capim kaolin clay selected for its platy shape factor was blunged to 60% solids. Six lbs/ton of primary mill chemical was added at the blunger to disperse the slurry. The blunged product was degritted on a 325# screen and the screen product classified using a solid bowl decanter into fine and coarse fractions. The fine fraction, containing 90–94% particles less than 2 μm, was discarded. The coarse b-fraction was diluted to 40% solids and mixed with 2 lbs/ton sodium polyacrylate chemical dispersing agent (Colloid.211). The dispersed coarse fraction was subjected to grinding in a 2:1 (volume/volume) mixture with 16–20 mesh ceramic beads for 30 minutes at 500 rpm. The ground product was then subjected to magnetic separation (2 minutes retention, fine matrix at 1.5 telsa), followed by reductive bleaching. The reductive bleaching was carried out first by reducing the pH to 2.8 using sulfuric acid. Then 4 lbs/ton sodium hydrosulfite bleach was added and the slurry stirred slowly for 20 minutes. The bleached slurry was then filtered on a vacuum filter and the filter cake rinsed with water. The filter cake was dried in an oven at 80 degrees centigrade and the dry product was made down with a "secondary mill chemical," a 2:1 mixture of sodium polyacrylate and sodium carbonate. The mixture was added until the resultant slurry had a pH of 7.0+/−0.2 units.

The psd of the material that became the final product in the foregoing example varied throughout the manufacturing process, especially after fractionation. The following table lists typical particle size distributions and selected physical properties of the final product.

TABLE 1

Selected Properties of Final Product

| Properties | Final Product |
| --- | --- |
| Brightness | 90.6 |
| PSD: | |
| <10 μm | 100 |
| <5 μm | 95 |

TABLE 1-continued

Selected Properties of Final Product

| Properties | Final Product |
| --- | --- |
| <2 μm | 67 |
| <1 μm | 38 |
| <0.5 μm | 17 |
| <0.25 μm | 7 |
| Shape Factor | 52 |

In the tables, particle size is expressed as particle size distribution, or psd, and shape is expressed as shape factor.

By the foregoing process, crudes such as Rio Capim feed clay, can be processed into a product with a high shape factor and high brightness. As the coarse fraction remaining after classification was subjected to sand-(or attrition-) grinding, the average particle shape factor increased from blocky (5 in this example) to very platy (52 in this example). Concurrently, the brightness of the product increased with beneficiation (e.g., from 73 to 90.6). Such combination of platiness and high brightness confers advantageous properties to the kaolin pigment when used for rotogravure printing.

COMPARATIVE EXAMPLE 2

Inventive Rio Capim clay ("RCC") pigment made in accordance with Example 1 was compared with commercial pigment products. Selected physical properties of the pigments are listed in Table 2 for the pigment of the present invention ("RCC 1") and selected prior art pigments: Astraplate (a U.S. delaminated clay of the present assignee having intermediate brightness and used in rotogravure coating formulations), CAPIM NP (a platy kaolin of the present assignee from Rio Capim Clay of high brightness and intermediate shape factor, used worldwide for rotogravure printing), and SS60 (a U.K. Rotoclay from the present assignee of lower brightness and high shape factor used extensively in Europe).

TABLE 2

Pigment Physical Properties

| | RCC #1 | Astraplate | CAPIM NP | SS60 |
| --- | --- | --- | --- | --- |
| GE Brightness | 90.5 | 86.7 | 90.3 | 84.0 |
| PSD % < 2 μm | 65 | 83 | 82 | 60 |
| PSD % < 1 μm | 4 | 11 | — | 10 |
| Brookfield viscosity | 90 | 400 | 210 | 550 |
| Hercules viscosity (rpm @18 dynes) | 310 | 380 | 718 | 210 |
| % Solids | 65 | 87.7 | 67.8 | 65 |
| Shape Factor | 52 | 37 | 28 | 59 |
| Steepness | 33.8 | 24.8 | — | 22.2 |

Various coating formulations were prepared using the selected and inventive pigments listed in Table 2. The target coating solids was 54%. The coating colors were applied over a range of coat weights targeting 5.5 g/m² using a Helicoater 2000 at a machine speed of 1000 m/min. The coated paper samples were calendared under equivalent conditions. The coating containing Astra-Plate was used to set the finishing conditions. Target gloss in this example was 48. The finishing conditions set with Astra-Plate were a line pressure of 382 pli, a temperature of 150° F., and a machine speed of 25 f/min. Formulation and coating color viscosity data are listed in Table 3.

TABLE 3

Rotogravure Formulation and Coating Color Viscosity Data

| | | | | |
|---|---|---|---|---|
| Astraplate | 75 | | | |
| Capim NP | | 75 | | |
| RCC #1 (inventive pigment) | | | 75 | |
| Suprasmooth 60 | | | | 75 |
| Alphatex | 10 | 10 | 10 | 10 |
| HP 1055 | 3 | 3 | 3 | 3 |
| KCS | 12 | 12 | 12 | 12 |
| Dispex | 0.1 | 0.1 | 0.1 | 0.1 |
| Roto latex | 6 | 6 | 6 | 6 |
| Additives | 1.2 | 1.3 | 1.3 | 1.2 |
| Brookfield viscosity Spindle.5 cps @ 100 rpm | 1016 | 1080 | 1128 | 1164 |
| Hercules viscosity | | | | |
| Dynes | 24 | 22 | 21 | 27 |
| Rpm | 42 | 39 | 36 | 48 |
| Temperature ° C. | 26 | 26 | 26 | 26 |
| % Solids | 53.7 | 53.9 | 52.0 | 51.7 |

Dispex is a dispersant by CIBA. HP 1055 is a hollow sphere plastic pigment by Rohm & Haas. Alphatex, Capim NP, Suprasmooth 60, and Astraplate are as described above.

The finished sheets were evaluated for sheet brightness, opacity, sheet gloss, Parker Print Surf Roughness, and Heliotest.

The Parker Print Surf test provides a measure of the smoothness of a paper surface. It comprises measuring the rate at which air under pressure leaks from a sample of the coated paper, under a known standard force, between an upper plate which incorporates an outlet for the compressed air, and a lower plate, the upper surface of which is covered with a sheet of either a soft or a hard reference supporting material according to the nature of the paper under test. From the rate of escape of the air, a root mean cube gap is measured (in microns) between the paper surface and the reference material is calculated. A smaller value of this gap represents a higher degree of smoothness of the surface of the paper under test.

The interpolated sheet property data are listed in Table 4.

TABLE 4

Interpolated Sheet Properties. Target Coat Weight 5.5 g/m$^2$

| | | | | |
|---|---|---|---|---|
| Astra Plate | 75 | | | |
| Capim NP | | 75 | | |
| RCC #1 (Inventive) | | | 75 | |
| Suprasmooth 60 | | | | 75 |
| Alphatex | 10 | 10 | 10 | 10 |
| HP 1055 | 3 | 3 | 3 | 3 |
| KCS | 12 | 12 | 12 | 12 |
| Coating # | 337 | 340 | 341 | 342 |
| Sheet Opacity | 79.4 | 80.8 | 81.2 | 81 |
| Sheet Brightness | 68.3 | 69.4 | 69.6 | 68.3 |
| Sheet Hunter Color L | 87.1 | 87.6 | 87.5 | 86.9 |
| a | 0.053 | 0.05 | 0.08 | −0.05 |
| b | 6.87 | 6.56 | 6.31 | 6.51 |
| Sheet Gloss | 49 | 48 | 49 | 46.2 |
| PPS S5 | 1.53 | 1.51 | 1.36 | 1.44 |

TABLE 4-continued

Interpolated Sheet Properties. Target Coat Weight 5.5 g/m$^2$

| | | | | |
|---|---|---|---|---|
| PPA 10S | 1.136 | 1.12 | 1.02 | 1.08 |
| Missing Dot (mm) | 12 | 13 | 27 | 20 |

Table 4 and FIG. 1 present comparative data of interpolated sheet brightness values for pigment compositions comprising the inventive (RCC #1) and selected prior art pigments. As can be seen in Table 4 and FIG. 1, the Capim products have the highest sheet brightness.

Figure 2:
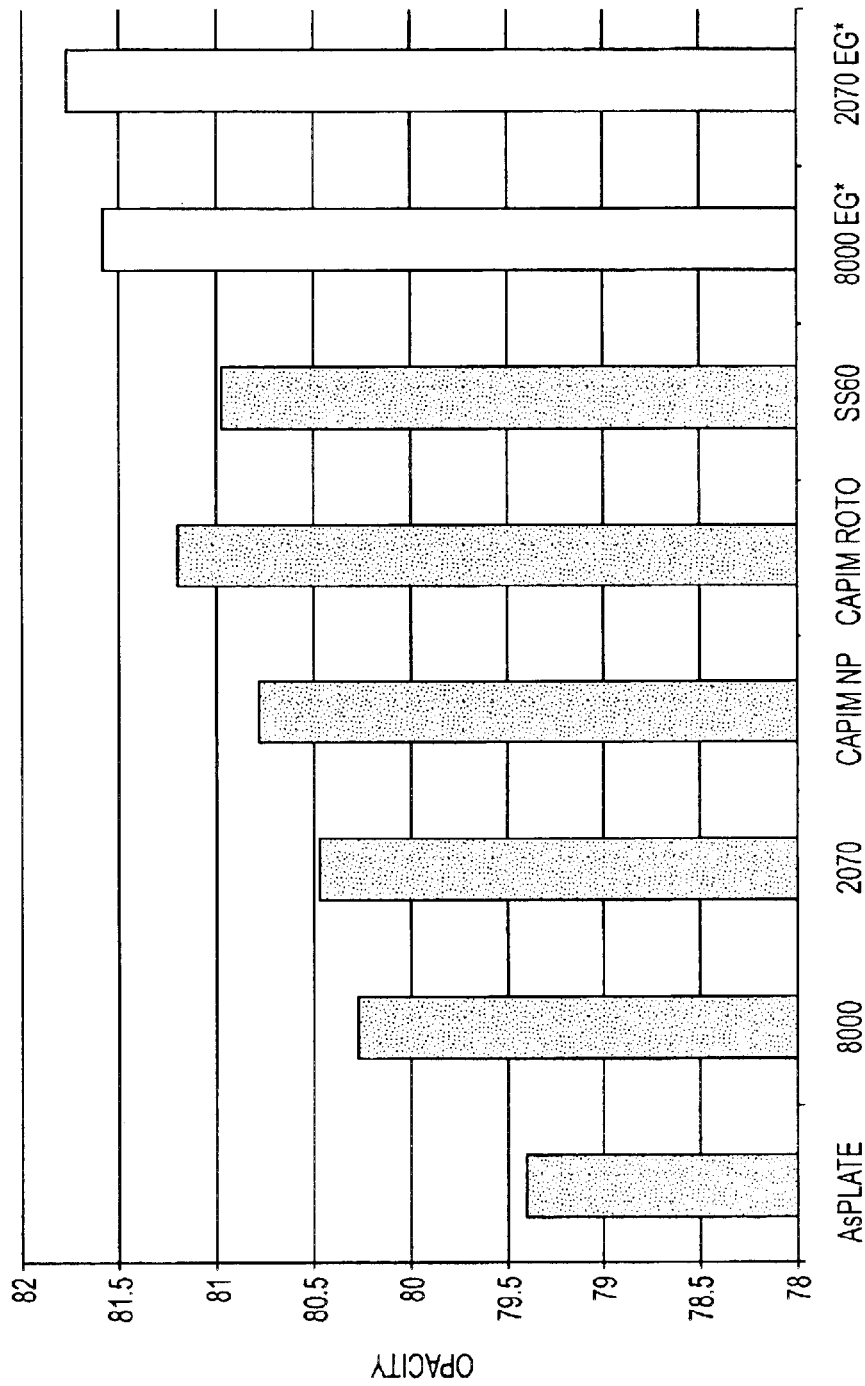
FIG. 2 presents comparative data of interpolated opacity values for the inventive and selected prior art pigments.

FIG. 2 presents comparative data of interpolated opacity values for the inventive and selected prior art pigments. Opacity values exceed Astra-Plate for all of the other pigments, as shown in FIG. 2 and in Table 4.

Figure 3:
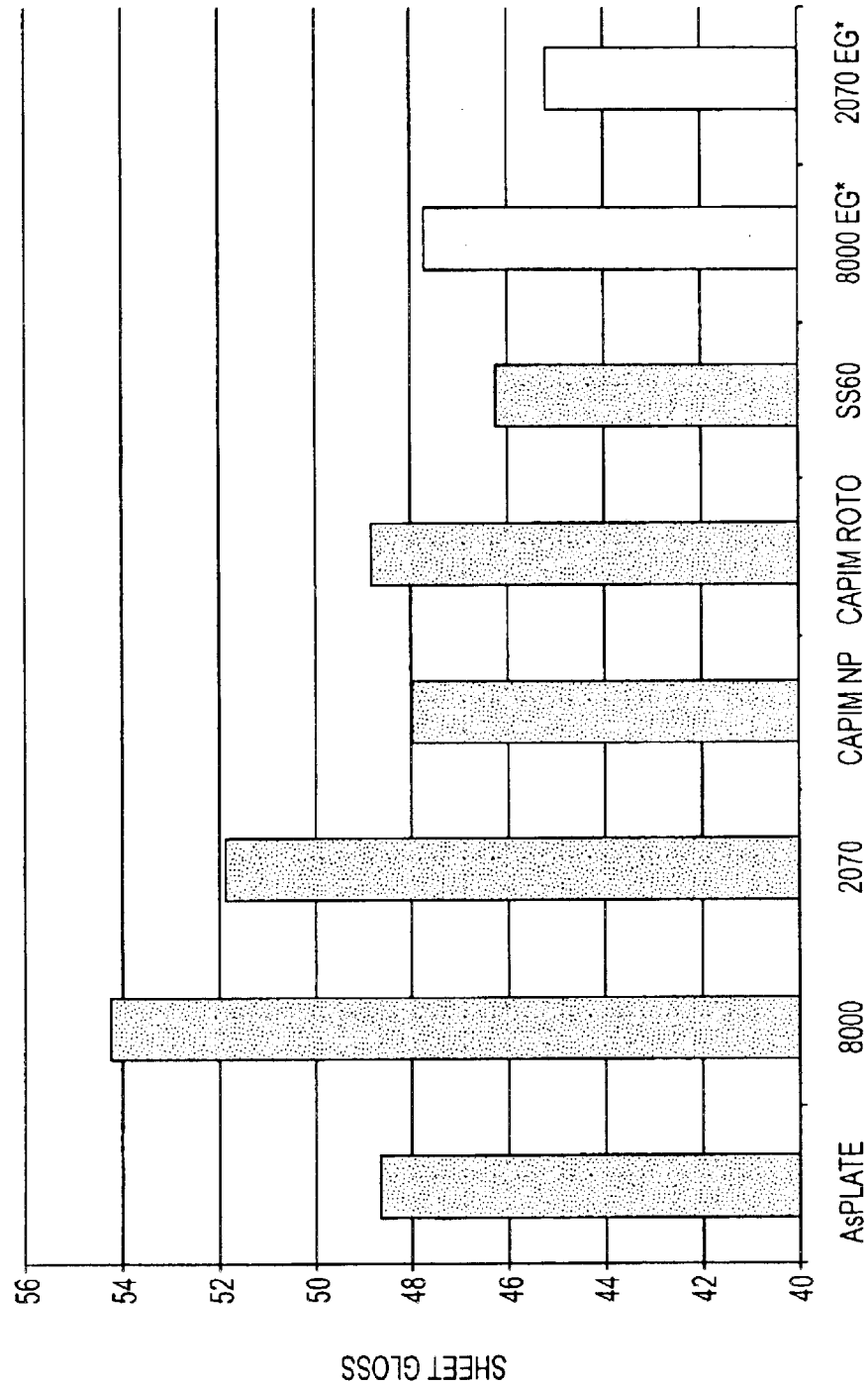
FIG. 3 presents comparative data of interpolated sheet gloss values for the inventive and selected prior art pigments.

FIG. 3 presents comparative data correlating Parker Print Surface Roughness data for surfaces coated with the inventive and selected pigments. Sheet gloss values were equivalent for the coarser particle sized pigments under the initial finishing conditions, as seen in Table 4. Sheet gloss values for all of the finishing conditions are set forth in FIG. 3 for comparison.

Figure 4:
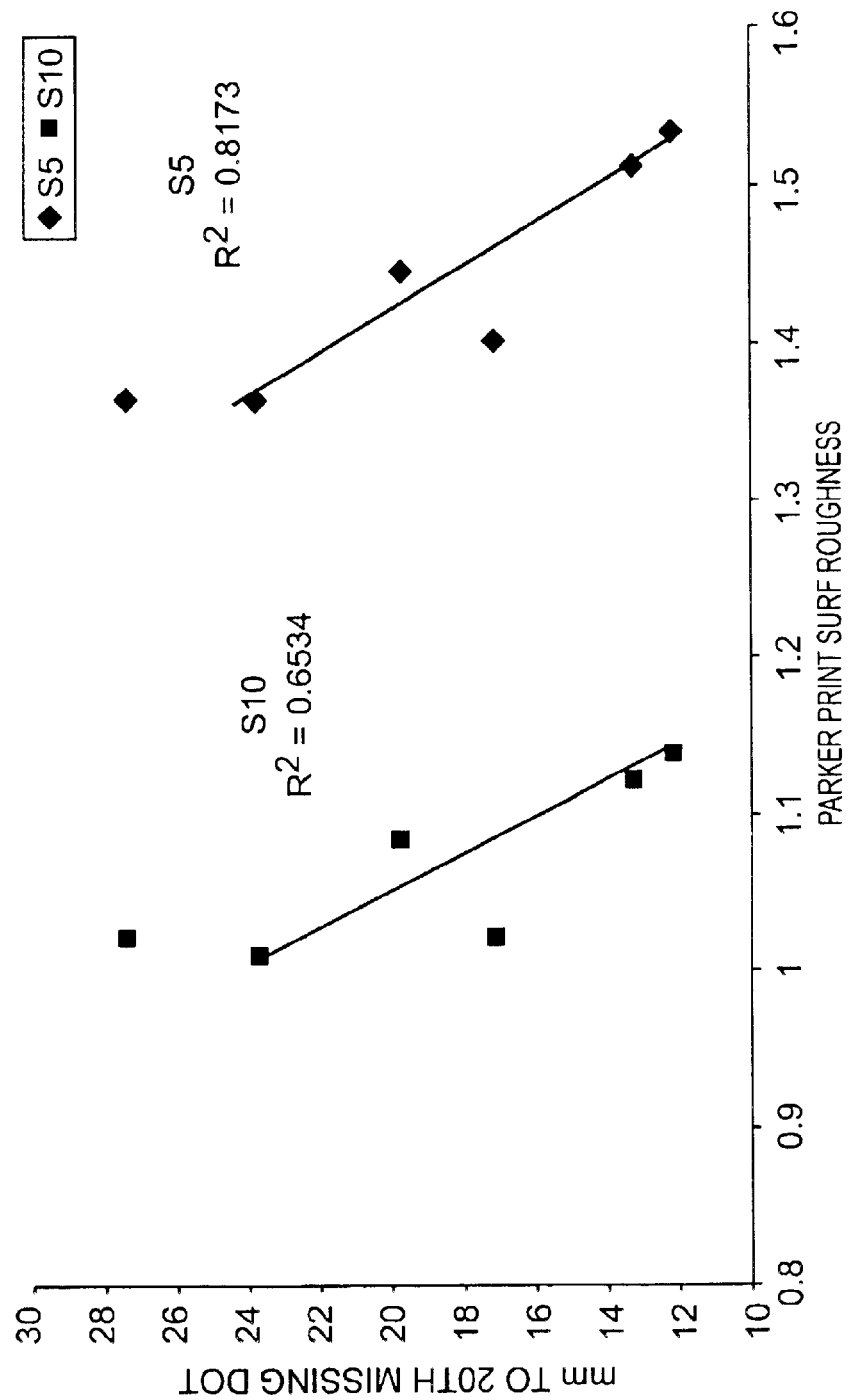
FIG. 4 presents a comparison of the correlation of Parker print surface roughness (PPS 5S) data to missing dots data.
Figure 5:
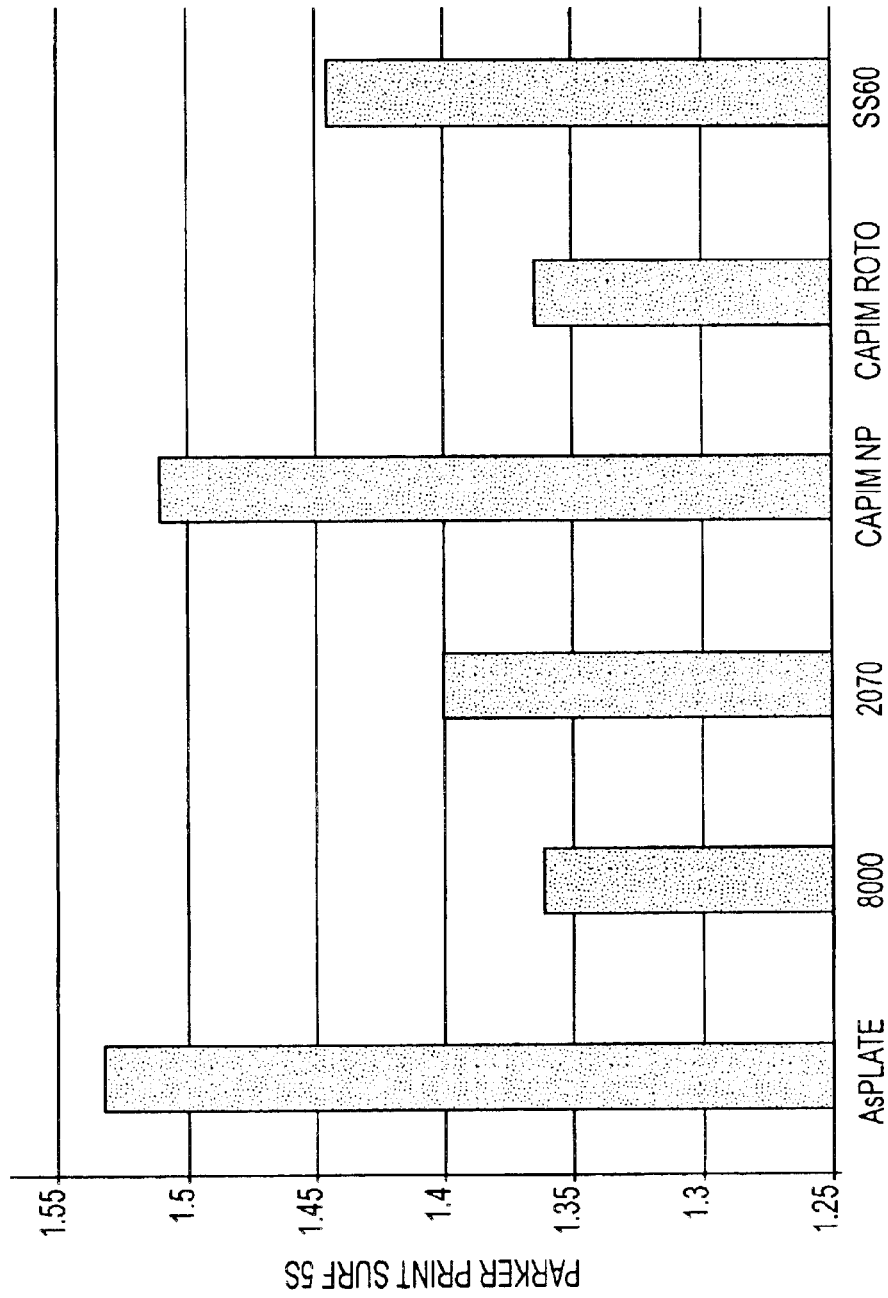
FIG. 5 presents comparative data of interpolated Parker Print Surface Roughness data for surfaces coated with the inventive and selected prior art pigments.

FIG. 4 presents comparative data of interpolated Parker Print Surface Roughness data for surfaces coated with the inventive and selected prior art pigments. Parker Print Surf Roughness show smoothest coating with RCC #1 and U.K. SS60 (FIG. 5) and correlate strongly with missing dot data as shown in FIG. 4.

Figure 6:
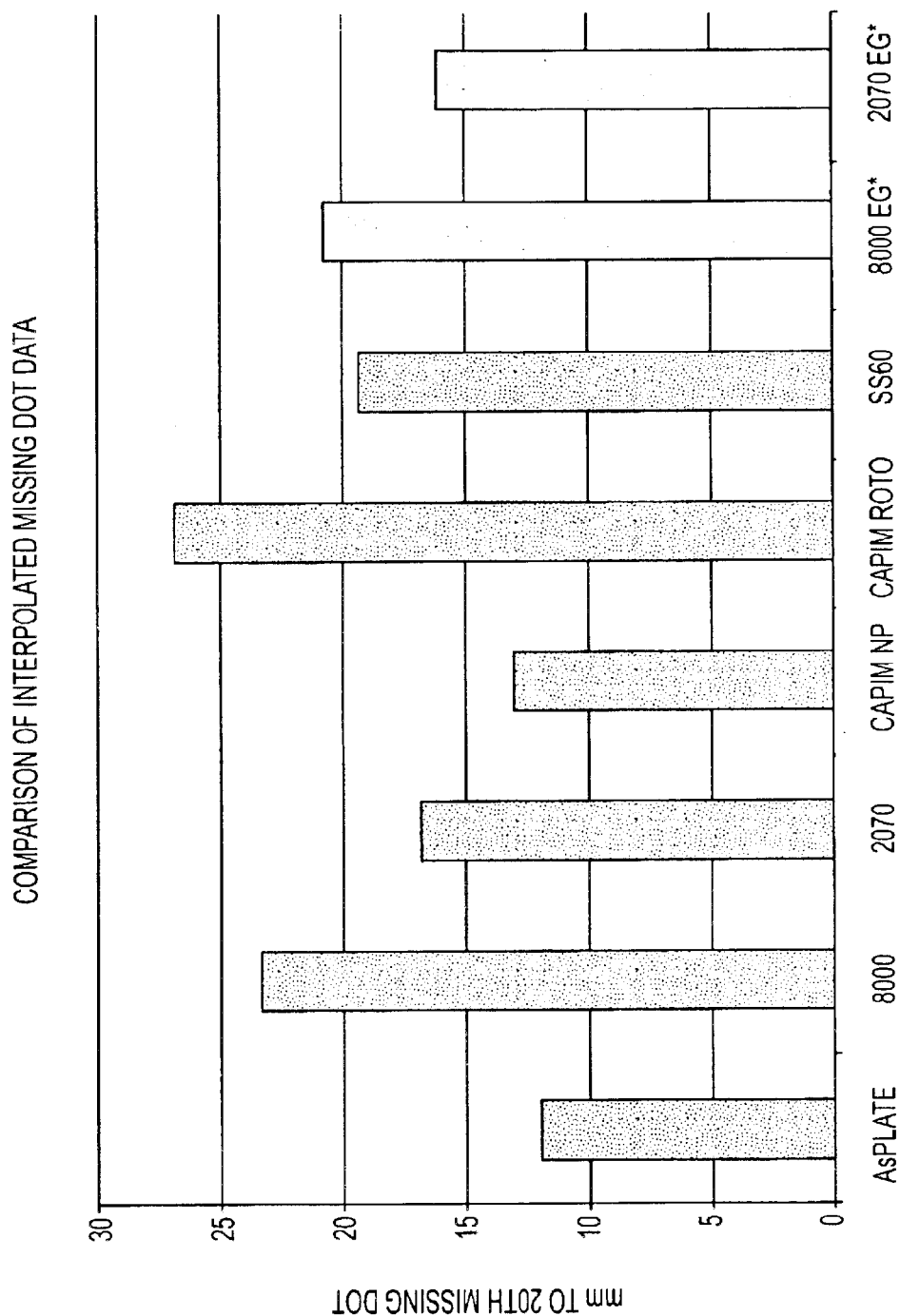
FIG. 6 presents comparative data of interpolated missing dots data for surfaces coated with the inventive and selected prior art pigments.

Missing dot data were measured as the distance in millimeters to the 20$^{th}$ missing dot. Larger values correlate to fewer missing dots. FIG. 6 presents comparative data of interpolated missing dots data for surfaces coated with the inventive and selected prior art pigments. RCC#1 and SS60 both exceeded the performance of Astra-Plate, as seen in FIG. 6. At equivalent sheet gloss, the inventive RCC pigment had the fewest missing dots and hence the best rotogravure printability.

EXAMPLE 3

Three coarse platy samples made from Rio Capim kaolins were evaluated in a generic ULWC rotogravure formulation. The experimental inventive samples varied in the percentage less than 2 microns from nominally to 50% to 70%. These samples, designated Capim Roto #2, #3, and #4, were compared to Astra-Plate, SS60, Capim NP, and Capim CC. The latter is also a product by the present assignee. Capim CC is the coarsest commercial product made from Rio Capim clay, which has found use in paper applications.

The experimental samples were produced by sand grinding Capim NP b fractions to nominal particle size targets of 50, 60, and 70 percent less than 2 microns, #2, #3, and #4, respectively. All of the experimental samples had a shape factor of approximately 60.

The experimental samples were compared to Astra-Plate, SS60, Capim NP, and Capim CC in a generic ULWC formulation. The physical properties of the pigments can be found in Table 5.

TABLE 5

Physical Properties of Selected Coating Clays

|  | Capim Roto #2 50 < 2 | Capim Roto #3 60 < 2 | Capim Roto #4 70 < 2 | Astra Plate | SS60 | Capim NP | Capim CC |
|---|---|---|---|---|---|---|---|
| Brightness (GE) | 90.23 | 90.82 | 91.13 | 88.5 | 84 | 90.6 | 89.4 |
| PSD % < 2 μm | 52.2 | 57.8 | 65.1 | 85.0 | 60.0 | 81.0 | 55.0 |
| Visc. Brookfield #1 @ 18 dynes | 164 | 160 | 167 | 270 | 1600/#2 | 165 | 45 |
| Visc. Herc. rpm @ 18 dynes | 500 | 551 | 400 | 689 | 210 | 380 | 2355 |
| Visc: Solids % | 64.1 | 64.7 | 65.0 | 67.5 | 65 | 69.2 | 65 |
| Shape Factor | 62.6 | 59.2 | 59.6 | 29 | 59 | 20 | 19 |

TABLE 6

Formulation

| Platy Clay | 75 |
|---|---|
| KCS | 12 |
| Alphatex Calcined Clay | 10 |
| HP 1055 | 3 |
| Latex | 6 |
| Calcium Stearate | 1 |

Table 6 depicts another coating forumlation. The coating colors containing coarse clays were applied at 2% lower coating solids. All of the colors were applied to a 35 g/m² ground wood base stock over a range of coat weights targeting 6 g/m². The coating colors were applied with the Helicoater 2000 at a speed of 1100 m/min. The amount of viscosity modifier was varied to reach a viscosity target of 1000 centipoise at 100 rpm. The coating color viscosities can be found in Table 7.

TABLE 7

Coating Color Viscosities

|  | Capim CC #2 50% < 2 μ | Capim CC #3 60% < 2 μ | Capim CC #4 70% < 2 μ | Astra-Plate | SS-60 | Capim NP | Capim CC | ND 2591.07 |
|---|---|---|---|---|---|---|---|---|
| RM 232 | 0.32 | 0.3 | 0.36 | 0.25 | 0.33 | 0.25 | 0.31 | 0.25 |
| Coating # | 840 | 841 | 842 | 838 | 844 | 843 | 845 | 839 |
| Brookfield viscosity: cps @ 100 rpm | 952 | 964 | 1010 | 1112 | 968 | 1116 | 972 | 1188 |
| Hercules Apparent viscosity: Centipoise | 34.6 | 32.5 | 38.6 | 39.8 | 39.3 | 44.6 | 22.6 | 45.0 |
| % Solids | 34.6 | 32.5 | 38.6 | 39.8 | 39.3 | 44.6 | 22.6 | 45.0 |

ND 2591.07 is a product of the present assignee not derived from Rio Capim kaolins. RM 232 is a thickener. The coated paper samples were calendered at 100° F. and 246 pli for 3 nips. The Astra-Plate coatings were used to set the conditions. The gloss target was 45% Hunter Gloss.

The sheet properties were interpolated to 6 g/m². The interpolated sheet property data can be found in Table 8.

TABLE 8

Interpolated Sheet Properties

|  | Capim Roto #2 50 < 2 | Capim Roto #3 60 < 2 | Capim Roto #4 70 < 2 | Astra-Plate | SS60 | Capim NP | Capim CC |
|---|---|---|---|---|---|---|---|
| Coating # | 849 | 841 | 842 | 838 | 844 | 843 | 845 |
| S Bright | 69.3 | 69.6 | 69.5 | 69.5 | 68.4 | 70.1 | 69.8 |
| Opacity | 81.5 | 81.5 | 81.3 | 81.1 | 81.4 | 81.4 | 80.5 |
| Sheet Gloss | 39 | 41 | 45 | 4e3 | 39 | 43 | 35 |
| Parker Print Surface S5 | 1.65 | 1.63 | 1.58 | 1.80 | 1.72 | 1.78 | 1.85 |
| Parker Print Surface S10 | 1.20 | 1.22 | 1.16 | 1.34 | 1.29 | 1.33 | 1.38 |
| Ct. Wt. | 5.4 | 5.3 | 5.8 | 5.8 | 6.2 | 5.5 | 6.1 |
| Missing Dots (mm) | 12.0 | 20.4 | 17.4 | 11.4 | 14.1 | 9.8 | 12.1 |

Figure 7:
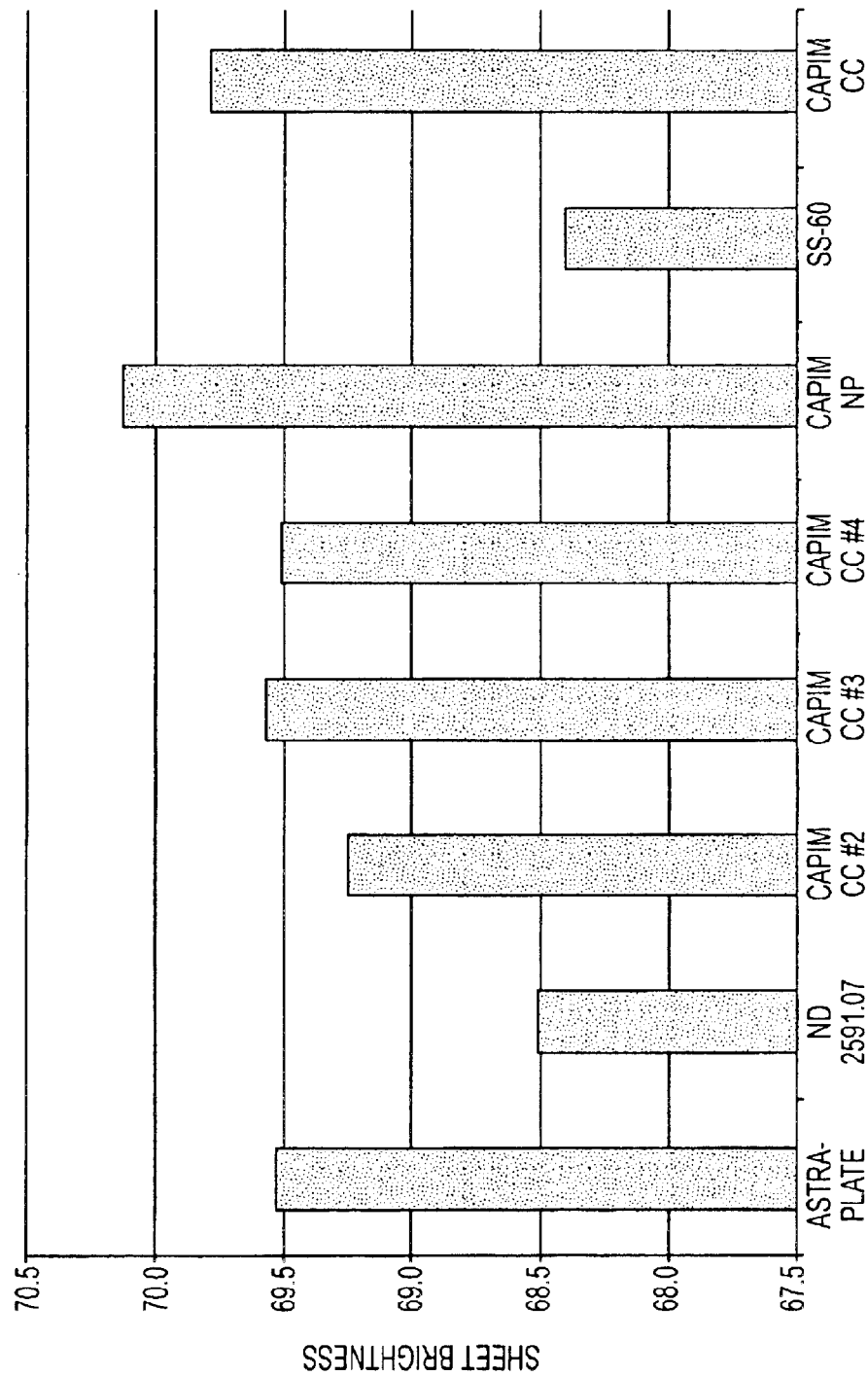
FIG. 7 presents comparative data of interpolated sheet brightness values of the inventive and selected prior art pigments.
Figure 8:
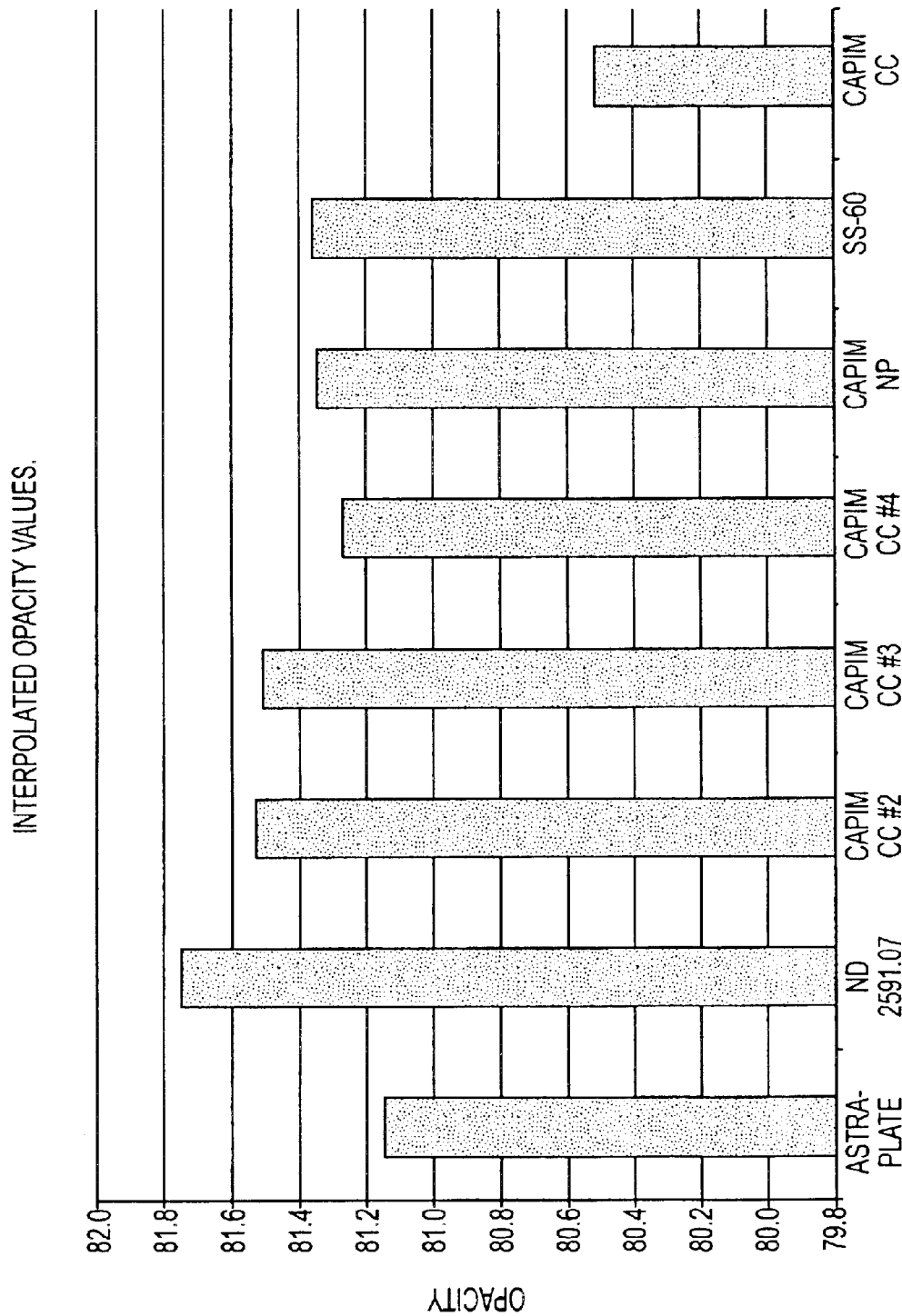
FIG. 8 presents comparative data of interpolated opacity values of the inventive and selected prior art pigments.

FIGS. 7 and 8 depict the interpolated sheet brightness and opacity values for the coatings, respectively. The U.K. sample stands out due to low sheet brightness values in comparison to the other coatings. The Brazilian clays had the highest pigment brightness of the evaluated pigments and developed higher sheet brightness. Capim CC is distinguished by the lowest opacity value, probably due to its coarse particle size and low shape factor. The remaining pigments have equivalent opacity.

Figure 9:
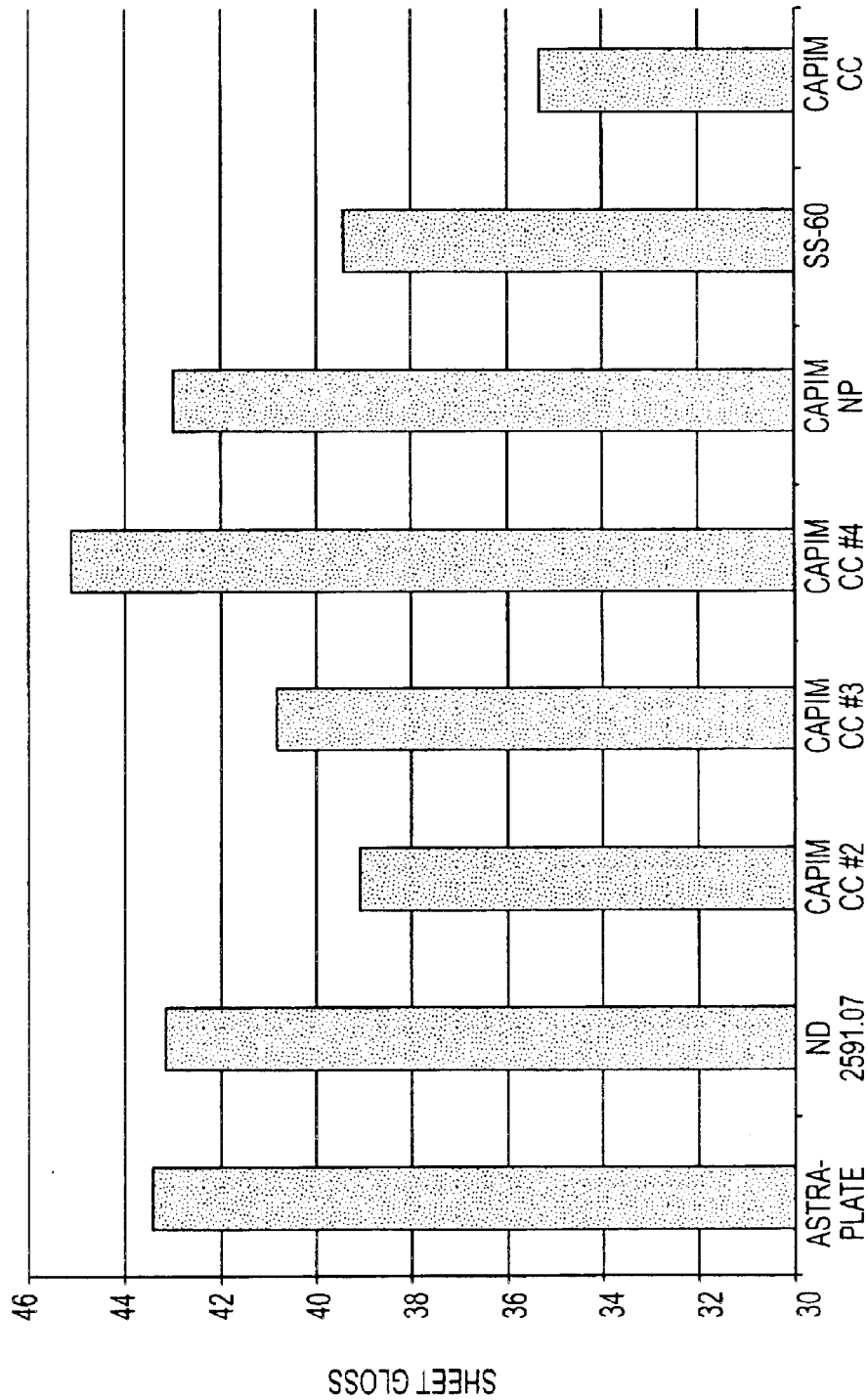
FIG. 9 presents comparative data of interpolated sheet gloss values of the inventive and selected prior art pigments.

Interpolated sheet gloss values, other than that of Capim CC, can be found in FIG. 9. The interpolated sheet gloss values are within +/−3.0 units of a mean value of 42. This has been interpreted to indicate the coatings are at equivalent sheet gloss. Variation of the nomial particle size target for the experimental samples seems to correlate with sheet gloss development.

Figure 10:
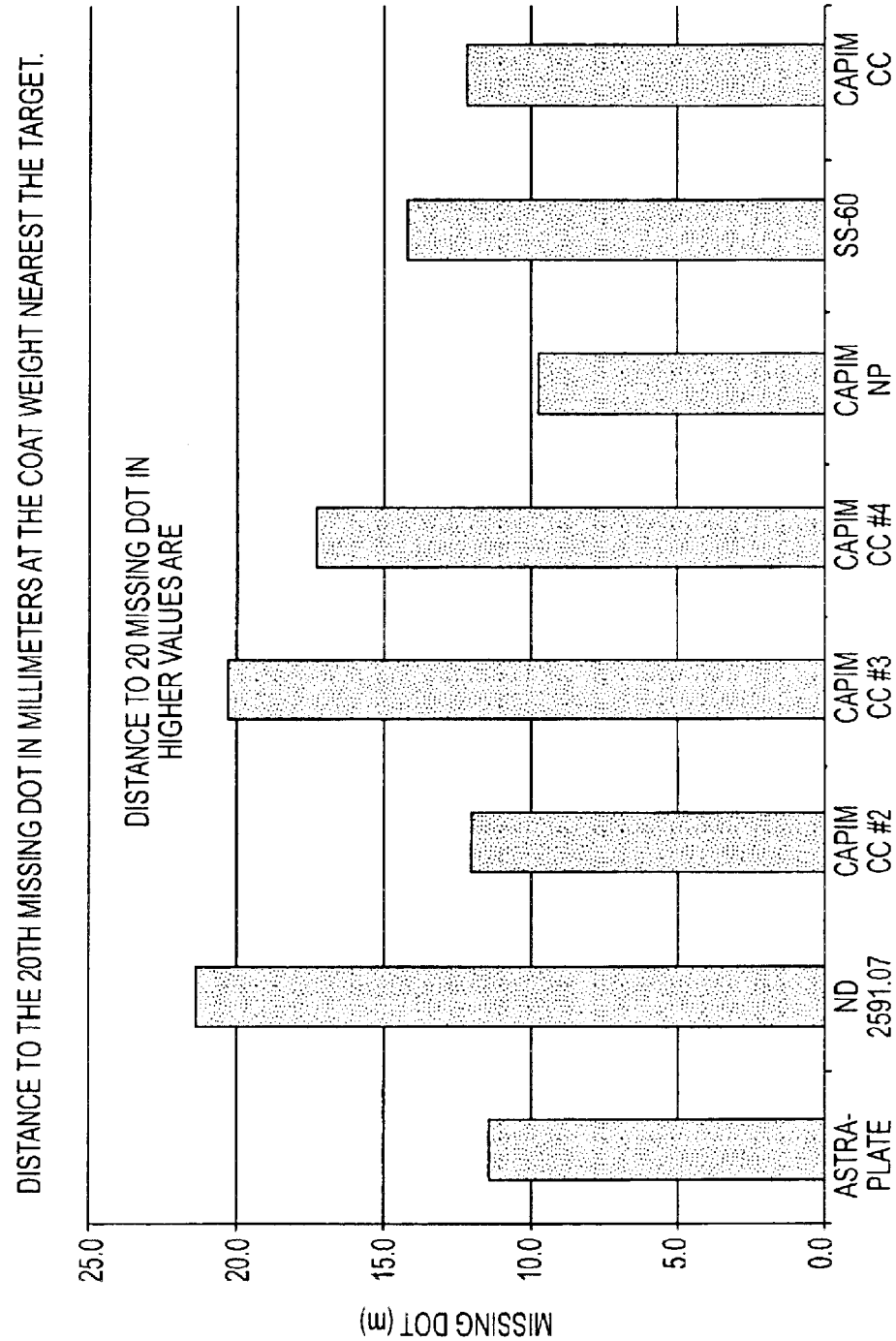
FIG. 10 presents comparative data of transfer efficiency values in which inventive and selected prior art pigments were used.

The rotogravure print quality is illustrated in FIG. 10 and shows in general coarse pigments having fewer missing dots than do finer pigments. Astra-Plate and Capim NP have the shortest distance to the 20$^{th}$ missing dot. Capim CC and the coarser experimental sample, Capim Roto #2, have distinctly shorter distances than the other coarse pigments.

Comparison of three coarse platy experimental samples from Rio Capim clay shows that variation in particle size influences sheet gloss. The variation in particle size did not systematically influence any other property at the basis weight evaluated. In comparison to the U.K. rotogravure product, the Brazilian clays developed higher sheet brightness and equal rotogravure print quality at equivalent sheet gloss. Capim CC was found to have lower opacity, sheet gloss, and print quality in comparison to the experimental samples. The performance of Capim CC relative to the experimental samples may reflect the value of shape factor.

It is to be understood that both the foregoing general description and the following detailed description are exemplary and explanatory only and are not restrictive of the invention, as claimed.

Other embodiments of the invention will be apparent to those skilled in the art from consideration of the specification and practice of the invention disclosed herein. It is intended that the specification and examples be considered as exemplary only, with a true scope and spirit of the invention being indicated by the

What is claimed is:

1. A kaolin pigment having the following characteristics:
Brightness (GE): at least about 89.0;
Shape Factor: at least about 30;
Brookfield viscosity, measured at 20 rpm and at less than or equal to about 65% solids: about 100 to about 700 centipoise; and
Hercules viscosity, measured at 18 dynes and at less than or equal to about 65% solids: about 200 rpm to about 1000 rpm.

2. A pigment of claim 1, wherein said kaolin is derived from Rio Capim kaolin.

3. A pigment of claim 1, wherein said shape factor is at least about 35.

4. A pigment of claim 3, wherein said shape factor is at least about 40.

5. A pigment of claim 4, wherein said shape factor is at least about 45.

6. A pigment of claim 5, wherein said shape factor is at least about 50.

7. A pigment of claim 1, wherein said brightness is at least about 90.0.

8. A pigment of claim 7, wherein said brightness is at least about 92.0.

9. A pigment of claim 3, wherein said brightness is at least about 90.0.

10. A pigment of claim 4, wherein said brightness is at least about 92.0.

11. A pigment of claim 1, said pigment having a steepness (d.30/d.70×100) of at least about 30.

12. A pigment of claim 1, wherein said Hercules viscosity is less than about 500 rpm.

13. A pigment of claim 12, wherein said Hercules viscosity is less than about 350 rpm.

14. A pigment of claim 1, having a particle size distribution, as measured as e.s.d. by sedigraph, satisfying the ratio:

$$\frac{\% \text{ finer than } 2.0 \ \mu m}{\% \text{ finer than } 0.5 \ \mu m} \geq \text{about } 3.$$

15. An ink composition comprising an ink base and a kaolin pigment of claim 1.

16. A paper coating composition comprising a coating base and a kaolin pigment of claim 1.

17. A paper coating composition of claim 16, wherein said coating base comprises at least one cellulose fiber, ancillary pigment, polymer, or sizing agent.

18. A paper coating composition of claim 16, wherein the kaolin pigment is derived from Rio Capim kaolin.

19. A paper coating composition of claim 16, wherein the shape factor of the kaolin pigment is at least about 35.

20. A paper coating composition of claim 19, wherein the shape factor of the kaolin pigment at least about 40.

21. A paper coating composition of claim 20, wherein the shape factor of the kaolin pigment is at least about 45.

22. A paper coating composition of claim 21, wherein the shape factor of the kaolin pigment is at least about 50.

23. A paper coating composition of claim 16, wherein the brightness of the kaolin pigment is at least about 90.0.

24. A paper coating composition of claim 16, wherein the brightness of the kaolin pigment is at least about 92.0.

25. A paper coating composition of claim 19, wherein the brightness of the kaolin pigment is at least about 90.0.

26. A paper coating composition of claim 20, wherein the brightness of the kaolin pigment is at least about 92.0.

27. A coated or filled paper comprising a cellulose based substrate and a kaolin pigment of claim 1.

28. A coated or filled paper of claim 27, wherein the kaolin pigment comprises Rio Capim kaolin.

29. A coated or filled paper of claim 27, wherein the shape factor of the kaolin pigment is at least about 35.

30. A coated or filled paper of claim 29, wherein the shape factor of the kaolin pigment is at least about 40.

31. A coated or filled paper of claim 30, wherein the shape factor of the kaolin pigment is at least about 45.

32. A coated or filled paper of claim 31, wherein the shape factor of the kaolin pigment is at least about 50.

33. A coated or filled paper of claim 27, wherein the brightness of the kaolin pigment is at least about 90.0.

34. A coated or filled paper of claim 33, wherein the brightness of the kaolin pigment is at least about 92.0.

35. A coated or filled paper of claim 29, wherein the brightness of the kaolin pigment is at least about 90.0.

36. A coated or filled paper of claim 30, wherein the brightness of the kaolin pigment is at least about 92.0.

37. A filled paper of claim 27, wherein the kaolin pigment comprises from about 1% to about 35% of said paper.

38. A coated paper of claim 27, wherein the kaolin pigment comprises from about 2% to about 10% of the paper coating.

39. A coated or filled paper of claim 27, wherein said paper is light weight coated paper.

40. A coated or filled paper of claim 27, wherein said paper is ultra light weight coated paper.

41. A coated or filled paper comprising a cellulose based substrate and a kaolin pigment, wherein said paper has a brightness of at least about 69 and, when printed, exhibits at least about 15 mm to the twentieth missing dot.

42. A coated or filled paper of claim 41, wherein said paper, when printed, exhibits at least about 20 mm to the twentieth missing dot.

43. A coated or filled paper of claim 42, wherein said paper, when printed, exhibits at least about 30 mm to the twentieth missing dot.

44. A method for making a kaolin pigment comprising:
 (a) Blunging and degritting crude kaolin;
 (b) Classifying the blunged crude kaolin into coarse and fine fractions;
 (c) Forming an aqueous suspension of said coarse fraction;
 (d) Delaminating said aqueous suspension; and
 (e) Beneficiating said aqueous suspension,
 wherein said method results in a kaolin pigment having the following characteristics:
  Brightness (GE): at least about 89.0;
  Shape Factor: at least about 30;
  Brookfield viscosity, measured at 20 rpm and at less than or equal to about 65% solids: about 100 to about 700 centipoise; and
  Hercules viscosity, measured at 18 dynes and at less than or equal to about 65% solids: about 200 rpm to about 1000 rpm.

45. A method of claim 44, wherein said crude kaolin comprises Rio Capim kaolin.

46. A method of claim 44, wherein said beneficiating comprises reductive bleaching.

47. A method for coating paper comprising providing a cellulose based substrate, and a coating said substrate with a paper coating composition of claim 16.

* * * * *

UNITED STATES PATENT AND TRADEMARK OFFICE
CERTIFICATE OF CORRECTION

PATENT NO. : 6,808,559 B2
DATED : October 26, 2004
INVENTOR(S) : Golley et al.

It is certified that error appears in the above-identified patent and that said Letters Patent is hereby corrected as shown below:

Column 17,
Line 2, "pigment at" should read -- pigment is at --.

Column 18,
Line 38, "and a coating" should read -- and coating --.

Signed and Sealed this

Eighth Day of February, 2005

JON W. DUDAS
*Director of the United States Patent and Trademark Office*